United States Patent [19]

McCorriston

[11] 4,389,378

[45] Jun. 21, 1983

[54] PROCESS USING SULPHATE REAGENT FOR RECOVERING VANADIUM FROM COKES DERIVED FROM HEAVY OILS

[75] Inventor: Lois L. McCorriston, Mississauga, Canada

[73] Assignee: Gulf Canada Limited, Toronto, Canada

[21] Appl. No.: 334,104

[22] Filed: Dec. 24, 1981

Related U.S. Application Data

[63] Continuation of Ser. No. 198,502, Oct. 20, 1980, abandoned.

[51] Int. Cl.$^3$ ............................................. C01G 31/00
[52] U.S. Cl. ....................................... 423/68; 423/67; 423/62
[58] Field of Search ...................... 423/62, 68; 75/121

[56] References Cited

U.S. PATENT DOCUMENTS

| | | |
|---|---|---|
| 831,280 | 9/1906 | Handy . |
| 2,187,750 | 1/1940 | Marvin .................................. 423/62 |
| 3,792,150 | 2/1974 | Maxwell et al. ...................... 423/62 |
| 4,087,510 | 5/1978 | Steenken ............................... 423/62 |
| 4,243,639 | 1/1981 | Haas et al. ............................ 423/68 |

FOREIGN PATENT DOCUMENTS 1331932 9/1973 United Kingdom .................. 423/62

*Primary Examiner*—Herbert T. Carter
*Attorney, Agent, or Firm*—D. R. Morrison; R. H. Saunders

[57] ABSTRACT

Vanadium values are recovered from cokes and ashes derived from heavy oils by a novel process comprising heating in the presence of alkali metal sulphate, contacting the resulting solid residue with water and recovering the vanadium values dissolved therein.

4 Claims, No Drawings

PROCESS USING SULPHATE REAGENT FOR RECOVERING VANADIUM FROM COKES DERIVED FROM HEAVY OILS

This is a continuation of application Ser. No. 198,502, filed Oct. 20, 1980, and now abandoned.

FIELD OF THE INVENTION

This invention relates to the recovery of vanadium from materials derived in the processing of heavy oils and bitumens wherein coke may be a by-product. More specifically, it relates to the recovery of vanadium from materials that may contain elemental carbon and other impurities along with the vanadium compounds by means of heating in the presence of air and certain inorganic salts which convert the vanadium values into compounds that are water-soluble and can therefore be easily separated and readily purified.

BACKGROUND

In the processing of heavy crude petroleums, oil sands, and similar raw materials, a common approach to the problem of their low hydrogen-to-carbon ratio is to diminish their carbon content by various types of coking processes. Generally in these processes a large amount of predominantly carbonaceous material (coke) is formed, whose high heating value makes it useful for process heating in the extraction plants. In the Flexicoking (Trade Mark) fluid coking process in which most of the coke is gasified after passing through the fluid coker, smaller amounts of coke are produced per unit of crude petroleum or other feed and consequently the ash and vanadium content of the coke from such process is higher than that of coke from other coking processes. Fly ash, a by-product of conventional combustion of petroleum coke, is not entirely free of carbonaceous materials and generally contains about 50% ash and 50% coke granules, depending upon the particular combustion process and the feedstock. The aforementioned ash portion of the coke and fly ash materials contains substantially all of the metallic minerals from the original heavy crudes, including the vanadium which occurs in heavy crudes in the form of porphyrins. The coke may also contain nickel compounds, and less valuable materials such as alumino-silicates and other inorganic compounds that may be carried over with the bitumen in the separation processes that are commonly employed in extracting bitumen from sand in mineable oil sands deposits. Some of the metallic constituents, particularly the vanadium and the nickel, have significant commercial value. Furthermore, if the metallic materials are deposited as tailings at plant sites or elsewhere, they are subject to leaching by rain and can cause contamination of ground water supplies, a potentially significant environmental hazard. It is therefore desirable to separate the commercially valuable materials and to render the residue as harmless as possible.

A known method for recovering metals contained in the residue from the distillation of heavy hydrocarbons is direct leaching of by-product fly ash. Acidic and alkaline solutions as well as water have been utilized as the leach solvent, but generally these methods exhibit poor yield of vanadium values and do not adequately separate the vanadium from any contaminants that may be present. As the acidity of the leach solvent increases, the yield of recovered metal usually increases, but the improvement is usually obtained at the cost of greater carryover of impurities, to the point where if 2-Normal sulphuric acid is employed, many of the components in the fly ash appear in the overflow solution and there remains the problem of separating a complex mixture, except that it is in the liquid (solution) phase.

Stemerowicz et al (Canadian Institute of Mining and Metallurgy Bulletin, April 1976, pp. 102–108) disclosed separation of a mineral-rich portion from a fly ash by-product of Suncor, Inc. at Fort McMurray, Alberta by flotation or alternatively, by combustive roasting of the coke to leave a mineral-rich portion as ash, and smelting of the mineral-rich fraction to obtain ferro-vanadium or metal alloys containing the vanadium along with other metals such as iron and silicon, in the elemental state. Losses of vanadium to the slag were 14% in the first stage and 20% to 58% in the second stage, and the product required further treatment to purify the vanadium.

In Vesely's patent, U.S. Pat. No. 3,522,001, a process was disclosed comprising mixing alkali metal halide with coke and burning the mixture at temperatures sufficiently high to fuse the metals and the salt, scrubbing the fused residue with a weak solution of sulphurous acid, forming a sulphurous acid solution of nickel chloride and slurry containing alkali metal vanadate, separating and recovering vanadium pentoxide from the slurry and performing three other steps to recover nickel oxide. No percentage yield of vanadium or purity of the product was disclosed in that patent.

As early as 1906, Handy (U.S. Pat. No. 831,280) disclosed the roasting of ores with any of several alkali salts, followed by water leaching. Although no temperature conditions were taught in the patent, it is clear that the process was operated well above the point of fusion of the salts because it was noted that alumina and silica were solubilized, an effect that occurs only substantially above the fusion point of the salt and in the presence of a large excess of salt.

Indeed, all of the known prior art processes appear to use temperatures high enough to fuse the roasting agent, and generally, increased temperatures are said to cause increased yields of metal values. Contrary to the teaching of the prior art disclosures it has been discovered that greatly increased recovery of highly purified vanadium can be obtained by operating at temperatures below the fusion point of the salt present during a heating stage in the novel process claimed herein.

The Handy patent asserted a need to remove sulphur prior to fusion of the ore with the salt. However, this approach unnecessarily consumes reagent; it has been found that high sulphur content of the raw material, measured as high as 12%, does not hinder recovery of the vanadium in the present invention. Furthermore, the presence of calcium is stated in the art (Lundquist, U.S. Pat. No. 2,640,754) to impede vanadium recovery from certain ores; however, it has been found that, in the process disclosed herein and without prior treatment with concentrated sulphuric acid, a high recovery can be obtained regardless of calcium (measured as Ca) in the raw material in a proportion up to at least 4.6%.

Prior art processes in general exhibit poor yields, high chemical consumption, and/or low specificity when applied to cokes and ashes derived from oil sands bitumen. Indeed, in a paper entitled "Potential for Recovering Vanadium from Athabasca Tar Sands", presented at the 26th Canadian Chemical Engineering Conference, Toronto, Oct. 3–6, 1976, L. A. Walker, R. W. Luhning and K. Rashid concluded, after tests which consumed excessive amounts of chemicals while yielding a maximum of 35% vanadium recovery, that "There is at the moment no economically feasible commercial recovery method."

In the following disclosure and claims, "alkali metal vanadate" comprehends both metavanadate, $MVO_3$, and pyrovanadate, $M_4V_2O_7$. All parts, proportions and percentages in the disclosure and claims are by weight unless specifically indicated otherwise.

PROCESS OF THE INVENTION

The present invention is a process for the recovery of vanadium from a sulfur-containing material of the group consisting of coke derived from hydrocarbonaceous oil, and ash obtained from said coke, wherein said hydrocarbonaceous oil is heavy oil, in-situ oil sands bitumen or mineable oil sands bitumen, comprising:
(a) mixing the material with an alkali metal sulphate reagent is a finely divided form,
(b) heating the mixture in the presence of an oxidizing atmosphere at an elevated temperature below the fusion point of the reagent,
(c) contacting the resulting solid residue with water, thereby forming a leach solution consisting essentially of water and sodium vanadate compounds, and
(d) recovering the vanadium values from the leach solution, the amount of said alkali metal sulphate being sufficient to convert the vanadium values present in said material into alkali metal vanadate and to maintain said leach solution substantially free of reagent.

The present invention is adaptable to raw materials derived from any of the well-known types of coking processes, for example, a delayed coker or fluid coker. It can be either coke produced by such process or the fly ash recovered from combustion of the coke, provided that the ash does not contain a substantial amount of vitrified material trapping the vanadium values. The raw material can originate from in-situ oil sands, mineable oil sands, in-situ heavy oil or other sources of crude hydrocarbons. It can contain appreciable amounts of sulphur, which does not inhibit the present process. The raw material, which is normally in finely divided form, is mixed with an alkali metal sulphate, preferably sodium sulphate. The cation, sodium, is usually interchangeable with other alkali metals and is selected in the present process because sodium compounds are relatively inexpensive compared to those of other alkali metals. The raw material-to-reagent ratio in the mixture is adjusted so that the reagent is present in an amount at least equal to the stoichiometric amount necessary to convert the vanadium values in the raw material into alkali metal metavanadate, and preferably at least 10% in excess of said stoichiometric amount. The excess of reagent over the stoichiometric quantity can be minimized by agitating the mixture during the heating step. The reagent can include water of hydration; it is preferred, however, that the reagent be anhydrous. No added water is used in the heating step. The mixture is heated under controlled conditions such that the temperature does not rise far enough to cause fusion of the reagent. It has been discovered that, contrary to the teachings in the art, fusion is not only unnecessary but also undesirable, in that fusion lowers the yield of valuable metal, and can also cause increased consumption of reagent. Thus for sodium sulphate, for example, the maximum temperature that the mixture should reach during heating is about 880° C. The heating is done in the presence of an oxidizing atmosphere in order to utilize, for heating of the mixture, part or all of the heat of combustion of any coke that may be present. The minimum useful temperature in the heating step is approximately 500° C., because the reaction rate is impracticably slow below that temperature. Where the raw material contains primarily carbon, the minimum temperature is about 760° C. in order to burn off the coke to permit improved contact between raw material and reagent. Where the raw material contains sufficient coke to sustain combustion, temperature control can be maintained by any or all of several means, for example, controlling air inflow to the combustion chamber, controlling inflow of the reaction mixture or removing heat by providing a means for heat transfer or by dilution with inert gases such as carbon dioxide. If, because of low coke content relative to the inorganic material, the combustion proceeds too slowly to maintain an adequate temperature for the formation of alkali metal vanadates, additional heat may be introduced or generated by appropriate means. After heating, the solid material contains the desirable vanadates as well as other materials including nickel compounds, silicates, alumina and other clay-like substances. The solid material is then contacted (leached) with water in order to dissolve the vanadates. It is preferred that the water be at a temperature in the range 60° C. to 100° C., to obtain a rapid solution rate, but because the vanadates produced are adequately soluble also in cold water, it is not mandatory that the water be hot. The water containing the dissolved vanadate is separated from the solid residue and the vanadate is recovered by known methods from the vanadate solution. A useful method is the addition of ammonia, which causes the precipitation of ammonium vanadate ($NH_4VO_3$), which in turn can be readily converted into the pentoxide or other desired form of vanadium. The solid material not dissolved by the leach water can then be treated for separation of the nickel values contained therein.

It has also been discovered, contrary to the teachings in the art, that the presence of calcium, aluminum, silicon, iron and nickel in the raw material does not hinder the specificity of the vanadium extraction by the process of this invention, as illustrated in the Examples hereinafter described. From the ash derived from heavy oils of the Cold Lake or Wabasca, Alberta deposits and from fluid coker and delayed coker operations using Athabasca tar sands bitumen, the only water-soluble material produced by the process is the sodium vanadate. Even a 100% excess of reagent over the stoichiometric level does not produce other soluble materials, provided that the temperature is maintained below the fusion point of the reagent.

The probable reaction mechanism during the heating process is that sodium metavanadate ($NaVO_3$) is formed first. In a slower reaction, pyrovanadate ($Na_4V_2O_7$) is formed when the metavanadate itself reacts with $Na_2SO_4$. Therefore the amount of reagent consumed is slightly more than that which would stoichiometrically react to form metavanadate, and the exact amount required for any given raw material is not accurately predictable. Whenever a stoichiometric amount is specified in this disclosure, it is based upon the reaction to metavanadate, $NaVO_3$.

The leaching solvent in the instant invention is water. Because the heating step renders the vanadium values water-soluble, strong leaching agents such as acids and bases are avoided, with the result that constituents other than the vanadate are not attacked and brought into the overflow solution. This fact assists markedly in maintaining the selectivity of the vanadium recovery, and significantly reduces potential environmental impact.

In heating with sulphate salts, sulphur dioxide and sulphur trioxide are the primary gaseous by-products. These are of less significance than the chlorine and hydrogen chloride gases given off in heating with chloride for two reasons: first, their corrosivities are lower, and secondly, there are already present some sulphur oxides due to the oxidation of any sulphur found in the coke or fly ash itself, which must themselves be removed to avoid contamination of the environment.

The advantages of using the present process are several, of which the high yield of vanadium and the specificity are the most important. Thus the process permits the production of highly purified vanadium values uncontaminated by other elements that may be present in the raw materials, for example nickel, iron or silicon. Another advantage is that the reagent used is an inexpensive and readily available salt. Another advantage over many prior art processes of the embodiment using coke as raw material is that the solubilization of the vanadium values is carried out in the same step as combustion of the coke, and thus the purchase of separate equipment for burning coke and roasting the resulting fly ash is avoided. A further advantage is the elimination of most if not all of the leachable materials from the tailings. Because soluble nickel compounds are not formed from the raw materials used in this process, the filtered residue contains substantially all the nickel from the coke or ash, and a still further advantage is thus the production of tailings with a nickel concentration higher than that of many Canadian ore deposits, making them valuable for further processing to obtain nickel values.

The process of the invention can be carried out as shown in the Examples, which describe preferred embodiments of the process.

EXAMPLE I

Samples of a delayed coker coke material manufactured by Suncor, Inc. from Athabasca oil sands bitumen were mixed with sodium sulphate in the ratio 100 units of coke to 2 units of salt by weight. The mixtures were heated at the specified temperature for a period of 2 hours in a constantly rotated quartz tube having an expanded centre section usable as a sample chamber. Into one end of the tube a uniform flow of preheated air was introduced in order to maintain an oxidizing atmosphere. After the heating period, the remaining solid material was removed from the furnace and contacted with water at a temperature of about 80° C. for three hours. After being filtered, the overflow solutions were diluted in volumetric flasks for analysis. Vanadium content was determined by atomic absorption spectrophotometry using the method of standard additions. Iron, nickel, silicon, aluminum and calcium analyses were done by atomic absorption using direct calibration. Table 1 shows the effect of temperature of heating upon the yield of vanadium in the overflow solution.

TABLE 1

| YIELD OF VANADIUM FROM SUNCOR COKE TEMPERATURE EFFECT USING SODIUM SULPHATE | |
|---|---|
| Heating Temperature °C. | Percent Yield |
| 790 | 67.3% |
| 844 | 57.4% |
| 900 | 50.4% |

It can be seen from Table 1 that the yield of vanadium from delayed coker coke differs from the prior art in that temperatures above the salt's fusion point do not bring about increased yields. A yield in the leach solution of more than two-thirds of the vanadium contained in the sample was achieved without any attempt to optimize reaction conditions, despite the presence of 4.6% calcium (measured as Ca) in the inorganic portion of the coke sample.

EXAMPLE II

Samples of coke manufactured by Syncrude Canada Ltd. from Athabasca oil sands bitumen were added at 540° C. The ash obtained was blended with sodium sulphate in the ratio of 10 parts ash to 2 parts salt. The blends were heated in a muffle oven at the noted temperatures for two hours; after one hour, the samples were shaken manually to remix the blends. The samples were then leached and analysed as described in Example I.

TABLE 2

| YIELD OF VANADIUM FROM SYNCRUDE COKE ASH TEMPERATURE EFFECT USING SODIUM SULPHATE | |
|---|---|
| Heating Temperature °C. | Percent Yield |
| 704 | 36.7% |
| 760 | 68.9% |
| 822 | 70.8% |
| 871 | 57.8% |
| 927 | 39.0% |

From Table 2 it is clear that the recovery of vanadium peaks at a temperature below the fusion point of the salt. The process of the invention is also shown to be operable with a range of raw materials from different sources.

Moreover, when carried out using cokes or ashes derived from cokes originating from any of several different sources, the process yields an overflow solution containing relatively small amounts of contaminants along with the desired vanadium values. Table 3 shows the concentrations of various contaminants found in the overflow solutions obtained from several sources and demonstrates the capability of the present process to give a high recovery of vanadium product with low contamination. Surprisingly, the levels of contaminants are well below the solubility products. Therefore, the contaminants are not precipitated during the vanadium recovery step using a properly chosen precipitating agent, for example an ammonium salt, and highly purified vanadium values are obtained without the necessity of a further purification step. All of the listed contaminants are found in the raw materials described in this disclosure.

TABLE 3
CONCENTRATION OF CONTAMINANTS IN OVERFLOW SOLUTIONS
Parts per million (by weight)

| | Raw Material Source | | |
|---|---|---|---|
| Contaminant | Bitumen Ash Suncor, Inc. | Coke Suncor, Inc. | Coke Ash Syncrude Canada Ltd. |
| Iron | <0.5 | <0.5 | <0.5 |
| Nickel | <0.5 | <0.5 | <0.5 |
| Aluminum | 1.0 | 1.5 | <1.0 |
| Silicon | 2.4 | 2.4 | 3.0 |
| Calcium | 1.0 | <0.5 | 3.3 |

The potential causes of contamination are several. One cause that may be encountered with some sources of raw material is the presence of soluble compounds in the raw material itself. This can normally be overcome in the vanadium precipitation or recovery step wherein the soluble contaminant does not co-precipitate with the vanadium compound. A second potential cause is the formation of soluble compounds other than alkali metal vanadate in the heating step. That this did not occur using the process of the invention is shown by Table 3, in that low amounts of contaminants were found in the overflow solution. Only vanadium appears to be substantially solubilized by the process. A third potential source of contamination is excess reagent, and the impurities can appear in two ways: (a) the excess reagent itself can appear unchanged in the overflow solution, or (b) the excess reagent in the overflow solution can encourage the solubilizing of other contaminants by ion exchange during leaching. With the raw materials used in the example, none of the above-described contaminating events took place. In no case did contamination of the overflow solution occur provided reasonable care was taken to avoid excesses of reagent. The small amounts of excess reagent that did show in the overflow solution are not precipitated using conventional methods of recovering vanadium values, for example precipitating with ammonia.

Numerous variations may be made in the process of the invention without departing from the essence thereof. Therefore, the invention is to be limited only within the scope of the appended claims.

What is claimed is:

1. A process for the recovery of vanadium from a sulphur-containing material of the group consisting of coke derived from oil and ash obtained from said coke, wherein said hydrocarbonaceous oil is heavy oil, in-situ oil sands bitumen or mineable oil sands bitumen, comprising:
   (a) mixing said material with an alkali metal sulphate reagent in a finely divided form,
   (b) heating the mixture in the presence of an oxidizing atmosphere at an elevated temperature below the fusion point of the reagent,
   (c) contacting the resulting solid residue with water, thereby forming a leach solution consisting essentially of water and sodium vanadate compounds, and
   (d) recovering the vanadium values from the leach solution, the amount of said alkali metal sulphate being sufficient to convert the vanadium values present in said material into alkali metal vanadate and to maintain said leach solution substantially free of reagent.

2. A process as claimed in claim 1 wherein said material is coke derived from said hydrocarbonaceous oil.

3. A process as claimed in claim 1 wherein said material is ash derived from the combustion of said coke.

4. A process as claimed in claim 1 wherein said heating step is carried out at a temperature between substantially 500° C. and substantially 880° C.

* * * * *